Patented Nov. 7, 1922.

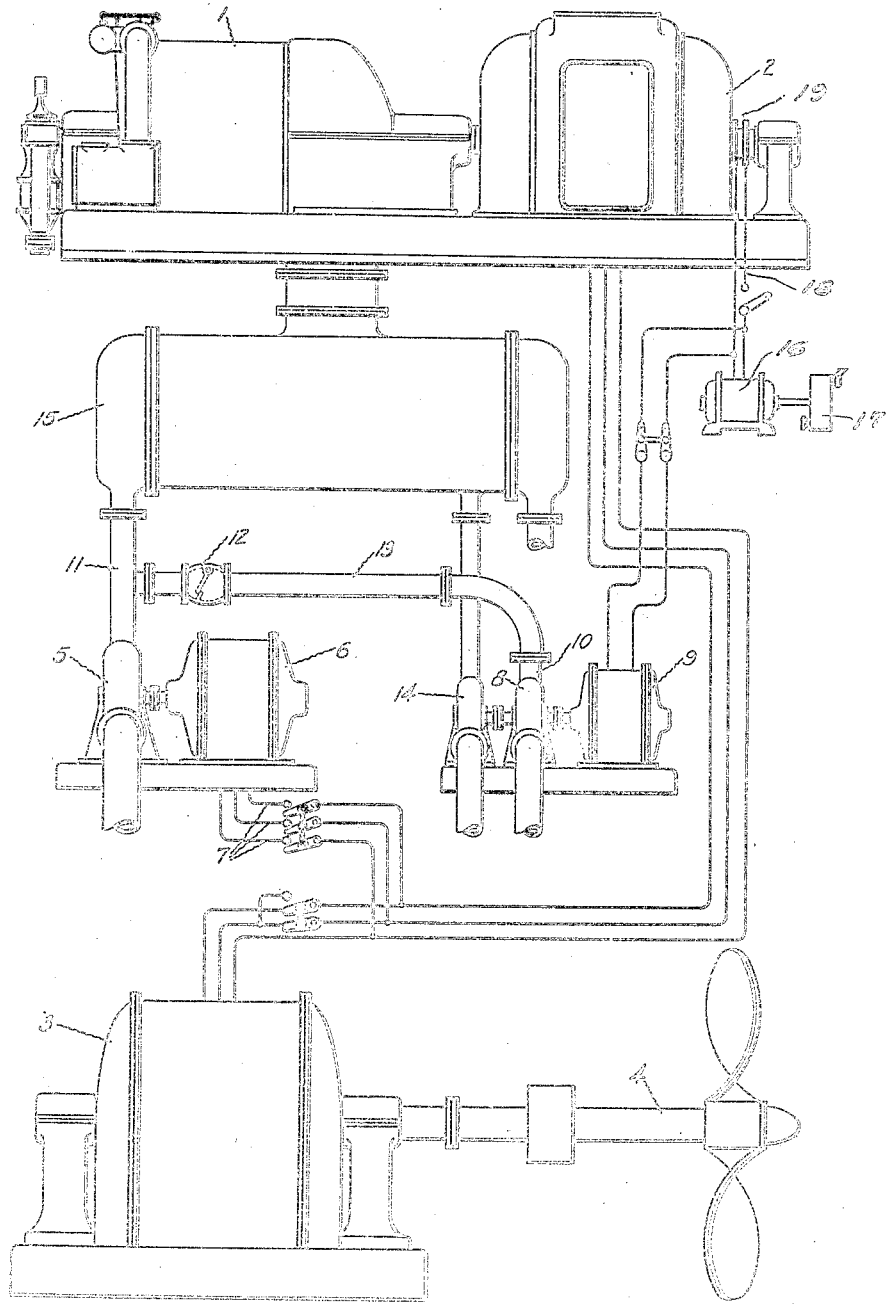

1,434,671

UNITED STATES PATENT OFFICE.

WALTER J. BELSEY, OF HELENSBURGH, ENGLAND.

SYSTEM OF ELECTRIC SHIP PROPULSION.

Application filed July 29, 1920. Serial No. 399,795.

*To all whom it may concern:*

Be it known that I, WALTER JAMES BELSEY, a subject of the King of Great Britain, residing at Helensburgh, England, have invented certain new and useful Improvements in Systems of Electric Ship Propulsion, of which the following is a specification.

This invention relates to systems of electric ship propulsion and has for its object to improve the efficiency of such systems.

In systems of electric ship propulsion, the auxiliaries such as the various pumps, fans, steering gear, etc., absorb a considerable amount of power which is usually supplied by an auxiliary turbine driven direct current generator, the main generator or generators being usually alternating current machines driven by the main turbine. The steam from the auxiliary turbine is usually employed to heat the feed water for the boilers but the amount of power required for all auxiliary machines is so large that the steam available from the auxiliary turbine is too great to be entirely utilized for steam heating.

According to the present invention, I reduce the amount of steam necessary for driving the auxiliary machines by utilizing electric motors supplied with current from the main generator for driving one or more of the auxiliary machines. As the circulating pump takes the most power to drive it, I prefer to connect this to a motor supplied with current from the main generator. This introduces a difficulty since the field current of the main generator is cut off when the circuit between the generator and propeller motor or motors is being controlled to perform maneuvering operations, such as starting and reversing, so that for this reason the supply of current from the main generator to the motor driving the circulating pump fails, and the pump tends to stop when the ship is maneuvering. As there would still be a considerable amount of steam passing through the main turbine it would quickly heat up the condenser to a dangerous point. To overcome this difficulty I provide an auxiliary circulating pump driven by a motor supplied with current from a convenient source such as an auxiliary generator which may also be the exciter for the main generator. As the amount of steam passing through the main turbine when the main field is cut off is very much less than when the main generator is working normally this auxiliary pump may be very much smaller than the main pump.

My invention will be better understood from the following description taken in connection with the accompanying drawing, and its scope will be pointed out in the appended claims.

The single figure of the accompanying drawing diagrammatically illustrates a ship propulsion system.

Referring to the drawing, 1 represents the main turbine directly coupled to the main alternating current generator 2, which supplies current to a synchronous motor 3 mounted on the propeller shaft 4. 15 represents the condenser through which the cooling water is circulated during normal operation by means of a circulating pump 5 driven by means of an alternating current motor 6 supplied with current from the main generator 2 through leads 7. To circulate the cooling water through the condenser when the field of generator 2 is cut off, I provide an auxiliary circulating pump 8 driven by a motor 9 supplied with current from an auxiliary generator. In the drawing the auxiliary generator for supplying the motor 9 is shown at 16, this generator being represented as driven by an auxiliary turbine 17. The generator 16 is shown as arranged to excite the main generator 2 through the mains 18 connected to the slip rings 19. Pump 8 is connected by a conduit 10 to a conduit 11 through which the circulating water normally passes, a non-return valve 12 being inserted in conduit 13 to prevent water from passing from the main to the auxiliary circulating pump. In the drawing, I have shown the auxiliary pump 8 directly coupled to a condensate pump 14 but this pump may be separately driven from the same source as the other auxiliaries if desired. With an arrangement such as above described the amount of steam available for feed water heating is still sufficient thereby improving the efficiency of the system.

What I claim as new and desire to secure by Letters Patent of the United States, is,—

1. A system of electric ship propulsion wherein the propeller is driven by a motor supplied with current from a main turbine driven generator, and wherein an auxiliary source is arranged to supply current to motors driving auxiliaries, characterized by the fact that a motor supplied with current from the main generator is arranged to drive the circulating pump and by the fact that a motor supplied with current from the auxiliary source is arranged to drive an auxiliary circulating pump for circulating the cooling water in the condenser when the main generator is not operating.

2. A system of electric ship propulsion comprising a main turbine driven generator, a propeller driving motor supplied thereby, motor driven auxiliary apparatus including a circulating pump for circulating cooling water in the condenser for the main turbine, connections for driving the circulating pump from the main generator, an auxiliary motor driven circulating pump also connected to circulate cooling water through said condenser, means for preventing water from passing from the main to the auxiliary circulating pump, an auxiliary turbine driven generator arranged to supply current to drive certain of said auxiliary apparatus, said auxiliary generator being connected to drive the motor of said auxiliary circulating pump to circulate cooling water when the main generator is inoperative.

3. A system of electric ship propulsion comprising a main turbine driven generator, a propeller driving motor supplied thereby, motor driven auxiliary apparatus, connections for driving certain of said auxiliary apparatus from said main generator, an auxiliary prime mover driven generator for supplying current to the rest of said auxiliary apparatus, auxiliary means for performing the function of certain of said auxiliary apparatus and means for operating said auxiliary means from said generator when the main generator is inoperative.

In witness whereof, I have hereunto set my hand this twelfth day of July, 1920.

W. J. BELSEY.